(12) United States Patent
Kjellberg et al.

(10) Patent No.: US 9,100,814 B2
(45) Date of Patent: Aug. 4, 2015

(54) FEDERATED DOWNLOAD OF DIGITAL CONTENT TO WIRELESS DEVICES

(75) Inventors: Rikard M. Kjellberg, Santa Cruz, CA (US); Joseph W. Azure, Belmont, CA (US); Richard M. Lee, Pleasanton, CA (US); Sheng Liang, Cupertino, CA (US)

(73) Assignee: UNWIRED PLANT, LLC, Reno, NV (US)

( * ) Notice: Subject to any disclaimer, the term of this patent is extended or adjusted under 35 U.S.C. 154(b) by 1992 days.

(21) Appl. No.: 10/794,826

(22) Filed: Mar. 4, 2004

(65) Prior Publication Data

US 2005/0071418 A1    Mar. 31, 2005

Related U.S. Application Data

(60) Provisional application No. 60/504,010, filed on Sep. 17, 2003.

(51) Int. Cl.
*G06F 21/00* (2013.01)
*H04W 8/24* (2009.01)
*G06Q 20/12* (2012.01)
(Continued)

(52) U.S. Cl.
CPC ............ *H04W 8/24* (2013.01); *G06Q 20/123* (2013.01); *G06Q 20/1235* (2013.01); *G06Q 20/32* (2013.01); *H04L 63/08* (2013.01); *H04L 67/04* (2013.01); *H04L 67/06* (2013.01); *H04L 67/1095* (2013.01); *H04L 67/28* (2013.01); *H04L 67/2838* (2013.01); *H04L 69/329* (2013.01); *H04W 12/06* (2013.01); *H04L 63/10* (2013.01); *H04L 2463/101* (2013.01); *H04W 12/08* (2013.01)

(58) Field of Classification Search
USPC ................................. 705/52, 51, 59
See application file for complete search history.

(56) References Cited

U.S. PATENT DOCUMENTS 5,835,724 A    11/1998 Smith
5,895,471 A    4/1999 King et al.
(Continued)

FOREIGN PATENT DOCUMENTS

EP    0 992 922 A2    4/2000
EP    1376438 A1    1/2004
(Continued)

OTHER PUBLICATIONS

White, Ron, "How Computers Work", Millennium Ed., Que Corporation, Indianapolis, IN, 1999.*
(Continued)

*Primary Examiner* — Jacob C. Coppola

(57) ABSTRACT

A content descriptor is received at a download server on a network from a remote content server, which is coupled to the download server through a computer network. The content descriptor is indicative of a selection by a user transmitted from a wireless client device to the remote content server and relating to a digital product hosted by the remote content server. The content descriptor is used by the download server to obtain the digital product from the remote content server. The digital product is then downloaded from the download server to the wireless client device via a wireless network. The content descriptor may include information such as a reference for use by the download server in locating the digital product, information describing the digital product, price information relating to the digital product, and/or information specifying a licensee of the digital product.

18 Claims, 13 Drawing Sheets

(51) Int. Cl.
*G06Q 20/32* (2012.01)
*H04L 29/06* (2006.01)
*H04W 12/06* (2009.01)
*H04L 29/08* (2006.01)
*H04W 12/08* (2009.01)

(56) References Cited

U.S. PATENT DOCUMENTS

| | | | |
|---|---|---|---|
| 6,032,130 A * | 2/2000 | Alloul et al. | 705/27 |
| 6,041,364 A | 3/2000 | Lortz et al. | |
| 6,049,892 A | 4/2000 | Casagrande et al. | |
| 6,076,166 A | 6/2000 | Moshfeghi et al. | |
| 6,085,247 A | 7/2000 | Parsons, Jr. et al. | |
| 6,161,140 A | 12/2000 | Moriya | |
| 6,167,441 A | 12/2000 | Himmel | |
| 6,223,289 B1 | 4/2001 | Wall et al. | |
| 6,226,618 B1 * | 5/2001 | Downs et al. | 705/51 |
| 6,275,692 B1 | 8/2001 | Skog | |
| 6,304,746 B1 | 10/2001 | Fascenda et al. | |
| 6,311,215 B1 | 10/2001 | Bakshi et al. | |
| 6,385,596 B1 * | 5/2002 | Wiser et al. | 705/51 |
| 6,430,624 B1 | 8/2002 | Jamtgaard et al. | |
| 6,438,576 B1 | 8/2002 | Huang et al. | |
| 6,460,020 B1 | 10/2002 | Pool et al. | |
| 6,473,609 B1 | 10/2002 | Schwartz et al. | |
| 6,493,430 B2 | 12/2002 | Leuca et al. | |
| 6,587,880 B1 | 7/2003 | Saigo et al. | |
| 6,714,797 B1 * | 3/2004 | Rautila | 455/552.1 |
| 6,721,554 B2 | 4/2004 | Gnesda et al. | |
| 6,785,769 B1 | 8/2004 | Jacobs et al. | |
| 6,895,234 B1 | 5/2005 | Laursen et al. | |
| 6,912,385 B2 | 6/2005 | Namba et al. | |
| 6,955,298 B2 | 10/2005 | Herle | |
| 7,013,289 B2 | 3/2006 | Horn et al. | |
| 7,072,984 B1 | 7/2006 | Polonsky et al. | |
| 7,089,295 B2 | 8/2006 | Christfort et al. | |
| 7,209,892 B1 * | 4/2007 | Galuten et al. | 705/26.62 |
| 7,233,790 B2 | 6/2007 | Kjellberg et al. | |
| 7,912,921 B2 * | 3/2011 | O'Rourke et al. | 709/219 |
| 2001/0034652 A1 * | 10/2001 | Kondo et al. | 705/14 |
| 2001/0037192 A1 | 11/2001 | Shimamoto et al. | |
| 2001/0047477 A1 | 11/2001 | Chiang | |
| 2001/0056493 A1 | 12/2001 | Mineo | |
| 2002/0004846 A1 * | 1/2002 | Garcia-Luna-Aceves et al. | 709/245 |
| 2002/0016162 A1 * | 2/2002 | Yoshihara et al. | 455/412 |
| 2002/0065944 A1 | 5/2002 | Hickey et al. | |
| 2002/0078253 A1 | 6/2002 | Szondy et al. | |
| 2002/0099616 A1 * | 7/2002 | Sweldens | 705/26 |
| 2002/0103881 A1 | 8/2002 | Granade et al. | |
| 2002/0112031 A1 | 8/2002 | Franklin et al. | |
| 2002/0113994 A1 | 8/2002 | Smith, II et al. | |
| 2002/0143888 A1 * | 10/2002 | Lisiecki et al. | 709/214 |
| 2002/0143971 A1 | 10/2002 | Govindarajan et al. | |
| 2002/0194219 A1 | 12/2002 | Bradley et al. | |
| 2002/0194473 A1 | 12/2002 | Pope et al. | |
| 2003/0014630 A1 * | 1/2003 | Spencer et al. | 713/168 |
| 2003/0017826 A1 | 1/2003 | Fishman et al. | |
| 2003/0022657 A1 | 1/2003 | Herschberg et al. | |
| 2003/0027581 A1 | 2/2003 | Jokinen et al. | |
| 2003/0028649 A1 | 2/2003 | Uhlik et al. | |
| 2003/0054794 A1 | 3/2003 | Zhang | |
| 2003/0060188 A1 | 3/2003 | Gidron et al. | |
| 2003/0084165 A1 | 5/2003 | Kjellberg et al. | |
| 2003/0101329 A1 | 5/2003 | Lahti et al. | |
| 2003/0104805 A1 | 6/2003 | Weksel | |
| 2003/0105835 A1 * | 6/2003 | Hori et al. | 709/219 |
| 2003/0112792 A1 * | 6/2003 | Cranor et al. | 370/352 |
| 2003/0140146 A1 | 7/2003 | Akers et al. | |
| 2003/0144898 A1 | 7/2003 | Bibelnieks et al. | |
| 2003/0158913 A1 | 8/2003 | Agnoli et al. | |
| 2003/0167392 A1 * | 9/2003 | Fransdonk | 713/156 |
| 2003/0187930 A1 | 10/2003 | Ghaffar et al. | |
| 2004/0024867 A1 | 2/2004 | Kjellberg | |
| 2004/0054786 A1 | 3/2004 | Kjellberg et al. | |
| 2004/0054787 A1 | 3/2004 | Kjellberg et al. | |
| 2004/0143652 A1 * | 7/2004 | Grannan et al. | 709/223 |
| 2004/0203681 A1 * | 10/2004 | Ross et al. | 455/418 |
| 2004/0248570 A1 | 12/2004 | Denenberg et al. | |
| 2004/0254960 A1 * | 12/2004 | Scaturro | 707/104.1 |
| 2004/0255115 A1 * | 12/2004 | DeMello et al. | 713/156 |
| 2005/0010648 A1 * | 1/2005 | Ramaswamy et al. | 709/217 |
| 2005/0038874 A1 * | 2/2005 | Ramaswamy et al. | 709/219 |
| 2005/0275758 A1 * | 12/2005 | McEvilly et al. | 348/725 |
| 2007/0089110 A1 * | 4/2007 | Li | 717/178 |
| 2008/0235360 A1 * | 9/2008 | Li et al. | 709/223 |
| 2010/0185306 A1 * | 7/2010 | Rhoads | 700/94 |

FOREIGN PATENT DOCUMENTS

| | | | |
|---|---|---|---|
| WO | WO 98/35469 A2 | 8/1998 | |
| WO | WO 98/35469 A3 | 8/1998 | |
| WO | WO 99/08208 A1 | 2/1999 | |
| WO | WO 99/26159 A2 | 5/1999 | |
| WO | WO 00/44147 A1 | 7/2000 | |
| WO | WO 00/70826 A2 | 11/2000 | |
| WO | WO 01/77783 A2 | 10/2001 | |
| WO | WO 01/97482 A1 | 12/2001 | |
| WO | WO 02/23857 A2 | 3/2002 | |
| WO | WO 02/27543 A2 | 4/2002 | |

OTHER PUBLICATIONS

Mohan et al. "Adapting Multimedia Internet Content of Universal Access," Mar. 1999, IEEE Transactions on Multimedia, vol. 1, No. 1.

Austaller, Gerhard, et al.: "Gulliver Beans: Generating Device Optimized and Individualized Content for WAP Applications", Proc. Workshop Information Design for Mobile Web Services, [Online] May 15, 2000, pp. 1-7, XP-002266242.

Ellipsus Systems: "Ellipsus' Mobile Application Provisioning System", White Paper, [Online] Sep. 23, 2001, pp. 0-10, XP-002266188.

Erik Bladh et al., "GPRS—Applicability and Expectations", Växjö University, School of Mathematics and Systems Engineering, Reports from MSI, Aug. 2002, pp. 1-64.

"A Vision for Dynamic Java Services Provisioning, The Java Services Vending Machine Concept", Jun. 2001, Version 1.0, Sun Microsystems, Inc., pp. 1-25.

Sheila Riley, "Sun-Microsoft Spat Now Carrying Over to Wireless World", Investor's Business Daily, 1 page.

* cited by examiner

FEDERATED DOWNLOAD OF DIGITAL CONTENT TO WIRELESS DEVICES

This application claims the benefit of Provisional U.S. Patent application No. 60/504,010, filed on Sep. 17, 2003 and entitled, "Federated Download Model", which is incorporated herein by reference.

FIELD OF THE INVENTION

At least one embodiment of the present invention pertains to systems and methods for providing digital content to wireless services subscribers, and more particularly, to a federated download model for providing digital content to wireless services subscribers.

BACKGROUND

Personal mobile communication/computing devices, such as cellular telephones, personal digital assistants (PDAs) and two-way pagers, can be referred to collectively as "mobile devices" or "wireless devices". The current state-of-the-art of mobile devices has advanced far beyond that of their predecessors. For example, early cellular telephones used analog signals to communicate over wireless telecommunications networks (or simply "wireless networks") and were nothing more than mobile telephones. Today's most advanced cellular telephones are all digital and provide many other functions in addition to telephony capability. For example, many of the latest generation of mobile telephones (and other mobile devices) allow their users to play games, access World Wide Web pages, exchange email, exchange and download files, exchange short messaging service (SMS) messages, and send and receive video.

With new mobile devices providing a wider range of capabilities, there is increasing demand among the users of these devices (i.e., wireless services subscribers) for new and interesting types of digital content that can be used on these mobile devices, such as games and other applications, images, ring tones, screensavers, wallpapers, etc. Although newer mobile devices often come pre-provisioned with certain digital products when first acquired by the subscriber, it is desirable to allow subscribers to acquire additional digital products for use in their mobile devices, as such products become available.

Certain obstacles have thus far hindered the ability to make a wide range of digital products available to wireless subscribers. On computer networks such as the Internet, typically some computers act as servers, by providing information or services to other computers that act as the clients. Users can search for information and visit servers as they please, as long as the servers provide them with access. Each server is responsible for access control and what information it provides to whom; this is referred to as a "federated" model.

The opposite of a federated model is a so-called "walled garden" model. A network modeled after a walled garden enforces strict access control to content and information. Only the server, or servers, inside the "walls" can be accessed by users. External servers can only provide content if the content is submitted to servers inside the walls.

Service providers such as wireless Communication Service Providers (CSPs) are generally concerned with problems related to the kind of content delivered to the client devices using their networks. These problems include the following:

Quality concerns—The issue is whether the content is going to be properly consumed by the client device. If the quality is poor, the customer support issues will be costly.

Content delivery—Depending on device characteristics and content type, the delivery method to the client device may vary. Sophisticated delivery mechanisms are required to be in place with each server that intends to serve content to consumer devices.

Rights management—The issue is whether the owner of the content can be assured that only client devices with rights to the content can use the content.

Revenue—Providing content for download is a service that can be monetized (i.e., generate revenue/profit). The issue is how a CSP can ensure that the content that is downloaded is properly billed.

Since the walled garden model offers strict control over available content, it addresses the foregoing problems. However, the walled garden model has its own set of problems, including:

Consumers are restricted to the services, content and information that are available in the walled garden. This restriction can be viewed as very undesirable, especially by a consumer group that is used to the Internet.

Scalability can become a problem when all consumers access a constrained resource, such as the limited number of servers available in the walled garden.

Service management becomes critical to the CSP. If the service does not provide a compelling user experience, service use and adoption will suffer. Many CSPs do not have core expertise in this field.

Lack of choice of name-brand content may result from poor content and supplier management by the CSP.

Therefore, the basic problem becomes: How can a federated network of content servers be provided to consumers, without losing the ability to charge for content usage, manage digital rights, ensure content quality, and deliver content to client devices in a robust and secure way? Thus, it is desirable to have a solution for providing digital content to wireless devices which combines the strict control of a walled garden with the freedom provided by a federated model.

SUMMARY OF THE INVENTION

The present invention includes a method of operating a download server on a network. A content descriptor is received at the download server from a remote content server, which is coupled to the download server through a computer network. The content descriptor is indicative of a selection by a user transmitted from a wireless client device to the remote content server and relating to a digital product hosted by the remote content server. The content descriptor is used by the download server to obtain the digital product from the remote content server. The digital product is then downloaded from the download server to the wireless client device via a wireless network.

In another aspect of the invention, a content server on a network hosts a digital product available for download to multiple wireless client devices. The content server receives a selection by a user from a wireless client device, the selection relating to the digital product. The wireless client device then contacts a remote download server, which is coupled through a computer network to the content server, after the selection is made. The content server sends a content descriptor indicative of the selection to the remote download server. The content server then sends the digital product to the remote download server, to be downloaded from the download server to an end user.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

A method and apparatus for federated download of digital content to wireless devices are described. Note that in this description, references to "one embodiment" or "an embodiment" mean that the feature being referred to is included in at least one embodiment of the present invention. Further, separate references to "one embodiment" or "an embodiment" in this description do not necessarily refer to the same embodiment; however, such embodiments are also not mutually exclusive unless so stated, and except as will be readily apparent to those skilled in the art from the description. For example, a feature, structure, act, etc. described in one embodiment may also be included in other embodiments. Thus, the present invention can include a variety of combinations and/or integrations of the embodiments described herein.

As used in this description, the terms "digital content", "digital product", "content", and "product" are used interchangeably to mean software and/or data embodying things such as games and other applications, applets or the like; images; screensavers; wallpaper; ring tones; etc., particularly (but not necessarily exclusively) those designed for use in mobile devices such as cellular telephones, PDAs and other small-footprint wireless/mobile devices. For convenience the terms "purchase" or "buy" are used to mean either actual purchase or any other conventional way in which a subscriber can acquire rights to use or posses digital content (e.g., by acquiring a license).

Overview

As described in greater detail below, a system which manages publication, purchase and delivery of digital content is implemented in a network server system on a network. The server system includes an application server referred to herein as the "download server". The download server may be implemented in the form of a single physical computing platform, or it may be implemented in the form of multiple physical computing platforms coupled to each other on a network, such as a local area network (LAN). Digital content providers can publish and manage their products using the download server via a computer network, such as the Internet, and can make their products available to wireless services subscribers through the download server for purchase or licensing. Subscribers can access the server system via wireless networks to purchase rights to download and use the digital content on their wireless communication devices.

Figure 1:
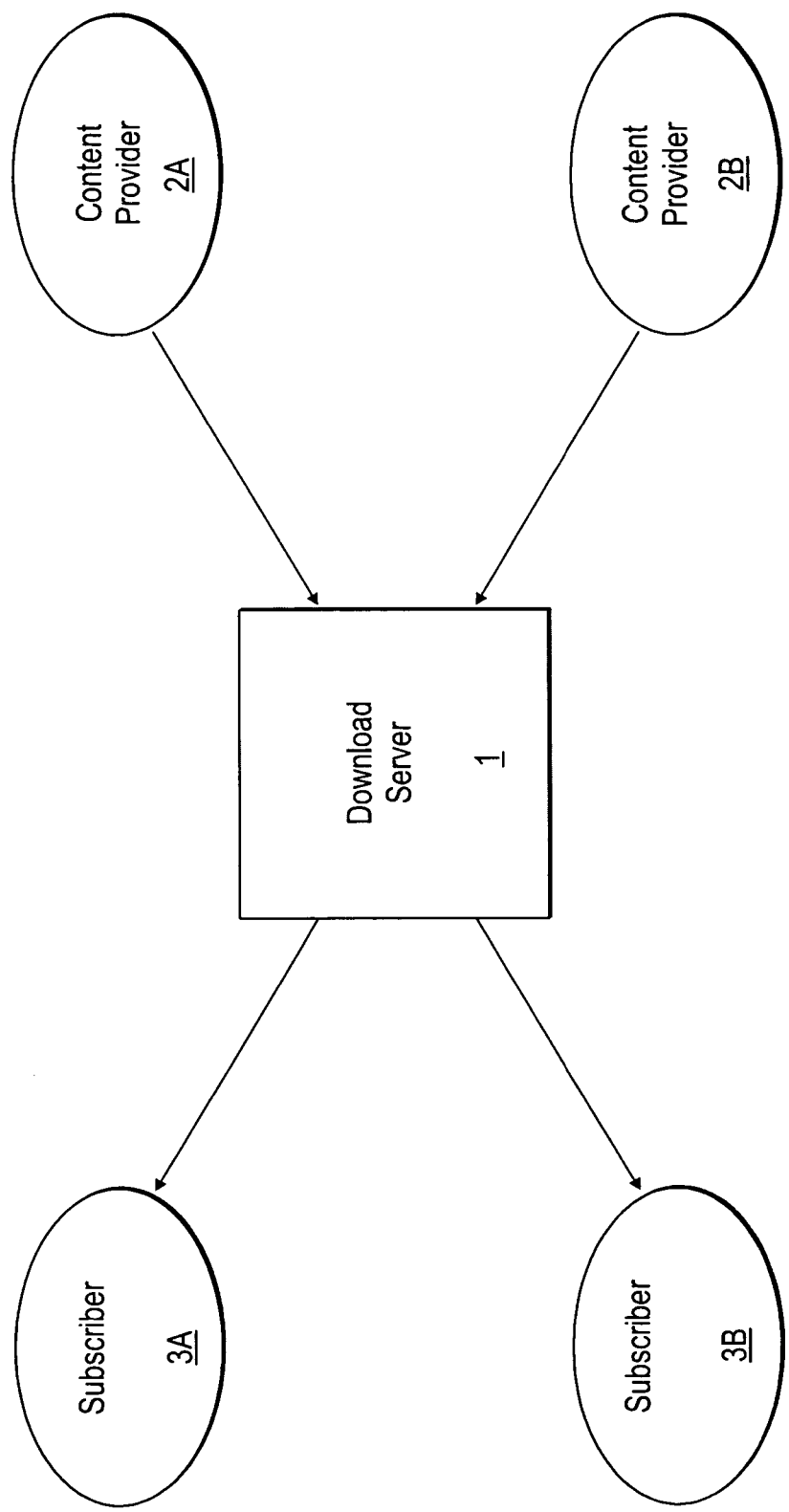
FIG. 1 illustrates the relationship between the download manager, content providers, and subscribers.

FIG. 1 illustrates the relationship between the download server, content providers, and wireless services subscribers (users of mobile devices), according to certain embodiments of the invention. The download server 1 acts as an intermediary between multiple content providers 2 (e.g., 2A, 2B, etc.) and multiple customers (e.g., 3A, 3B, etc.), e.g., wireless services subscribers. To facilitate description, it is henceforth assumed herein that the customers 3 are users of wireless devices and, therefore, are subscribers of wireless services (although that need not be the case); thus, customers are henceforth called "subscribers" herein. Note, however, that the techniques described herein need not be limited to wireless services subscribers or wireless devices.

Network Environment

Figure 2:
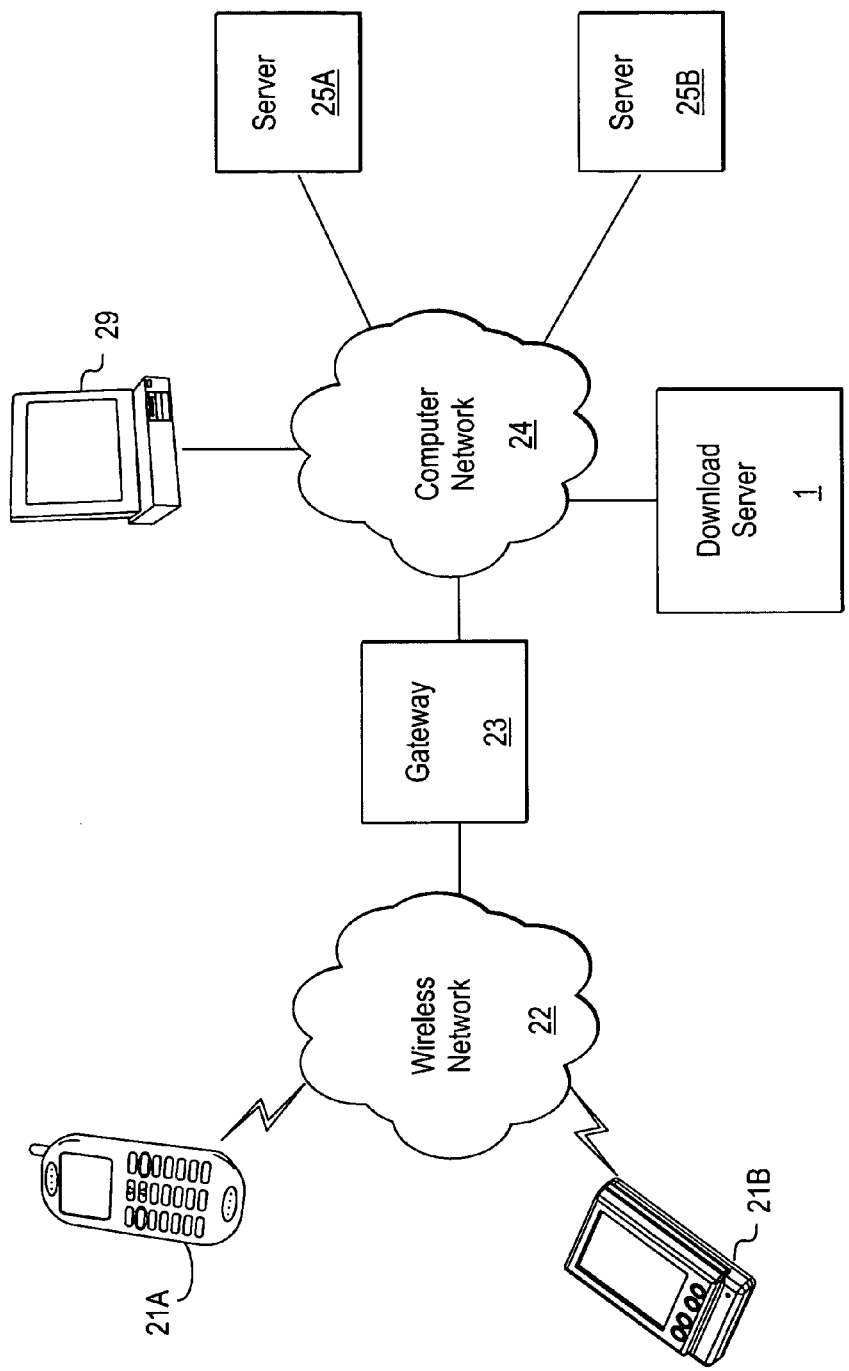
FIG. 2 shows a network architecture in which a download manager in accordance with the invention can be deployed.

FIG. 2 shows a network architecture in which a download server in accordance with the invention can be advantageously deployed. One or more wireless networks 22 are connected to a computer network 24 through corresponding gateways 23. The computer network 24 may be the Internet, although alternatively, it could be essentially any other type of computer network, such as a corporate intranet, a local area network (LAN), etc., or a combination of such networks.

A number of mobile client devices 21 (e.g., 21A, 21B, etc.) operate on each wireless network 22. A number of servers 25 (e.g., 25A, 25B, etc.) operate on the computer network 24 to provide a variety of services for the mobile devices 21 and/or to one or more non-wireless client devices 29 coupled to the computer network 24. For example, the servers 25 may include World Wide Web servers, file servers, application servers, etc.

Each gateway 23 can be operated by the operator of the wireless network (the "wireless carrier") to which it is directly connected. Each gateway 23 provides an interface between a particular wireless network 22 and the computer network 24 (e.g., the Internet), providing routing and, if necessary, appropriate protocol translation and/or content transcoding. In some cases, the gateway 23 may be a standalone device or system. In other cases, the gateway 23 may be part of a more-capable server system that provides additional value-added services to users of client devices 21; such as a proxy service, a provisioning manager, etc. An example of such a gateway is the Mobile Access Gateway available from Openwave Systems of Redwood City, Calif.

A download server 1 in accordance with the present invention is connected to the computer network 24, either directly (as shown) or indirectly. The download server 1 may be operated by a wireless carrier.

Download Server

Figure 3:
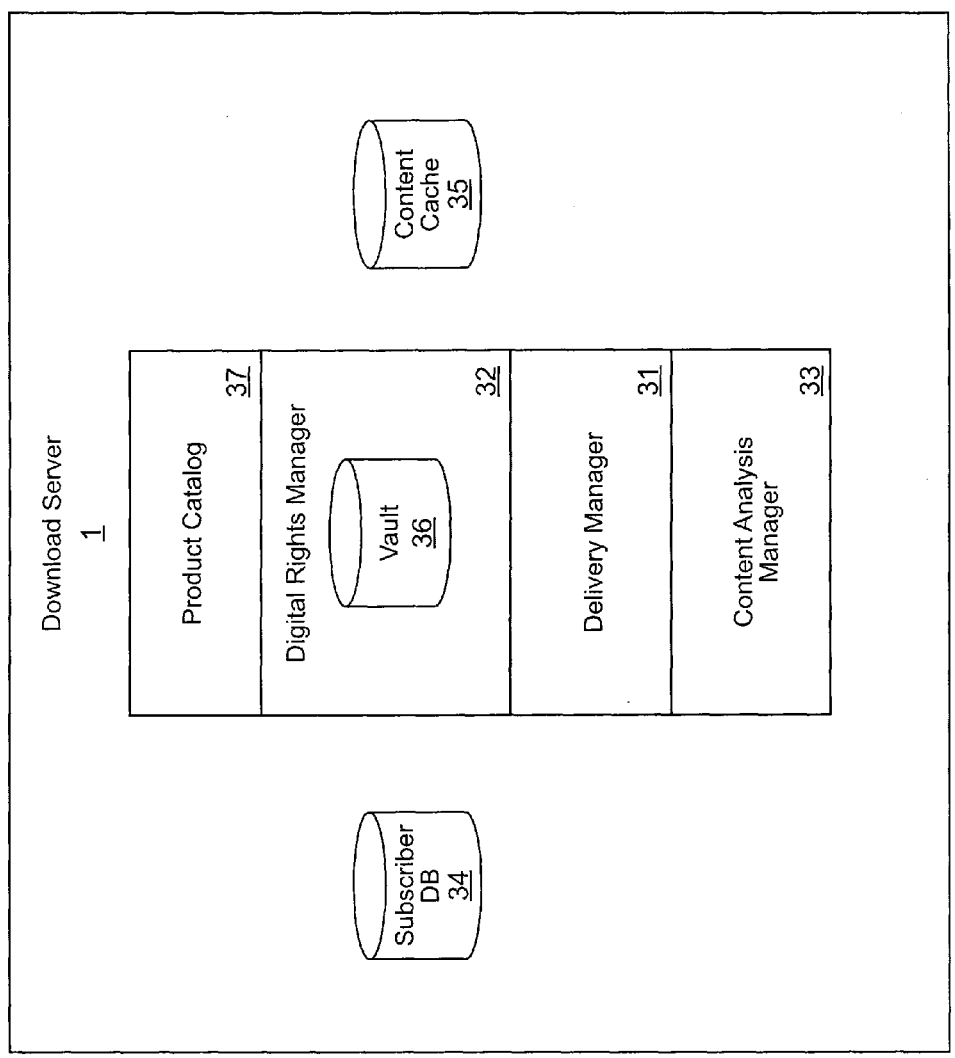
FIG. 3 schematically shows the components of the download manager according to certain embodiments.

FIG. 3 schematically shows the download server 1 in greater detail, according to certain embodiments of the invention. In the illustrated embodiment, the major components of the download server 1 include a delivery manager 31, a digital rights manager 32, a content analysis manager 33, a subscriber database 34, a content cache 35, and a product catalog 37. The digital rights manager 32 includes another database 36, known as the personal vault 36. Each of these components is preferably implemented in the form of software, data, or a combination of software and data. However, in other embodiments, at least some of these components could be implemented using hardwired circuitry.

The product catalog 37 facilitates discovery and purchase of digital products by subscribers. The product catalog 37 is a database and an electronic commerce storefront that controls the subscriber shopping experience. Content providers submit content into the product catalog 37. Product administrators associated with the download server 1 approve and publish content in the product catalog 37, which subscribers can then discover and purchase.

The delivery manager 31 is the download server's interface to the various subscribers and is responsible for delivering purchased digital content to subscribers. Once the download server 1 verifies that the subscriber owns the right to the content, the delivery manager 31 can perform content delivery. The delivery manager 31 is responsible for applying the appropriate delivery channel based on any of a number of factors, such as content type, device capability, and subscriber preference. The delivery manager 31 further is responsible for invoking one of multiple available protocol handlers which is appropriate for communicating with each requesting mobile device.

The digital rights manager 32 is responsible for performing digital rights management (DRM) operations, as described further below, based at least partially on information stored in the personal vault 36. Among other things, the digital rights manager 32 is responsible for tracking product usage and license renewal purchase. The personal vault 36 stores, on a subscriber-by-subscriber basis, information to facilitate DRM, such as product licenses and/or other "purchase" information of the products purchased by each subscriber. This allows a subscriber to remove downloaded content from a mobile device without losing rights to the product, or to recover products on a device in cases of device hard reset, loss, etc.

The subscriber database 34 stores various information on all subscribers served by the download server 1. The stored information may include, for example, wireless device type and identifier number, contact information, account information, etc. for each subscriber. The content cache 35 stores digital products that have been downloaded from content providers, in order to speed up subsequent downloads from the download server 1 to client devices 21.

The content analysis manager 33 manages a process of verifying content quality and compliance with various requirements when the content is initially obtained by the download server 1 from a content provider (e.g., compliance with its declared type, content structure resource utilization, etc.). Content must pass the content analysis process satisfactorily before being made available for download to subscribers.

Figure 4:
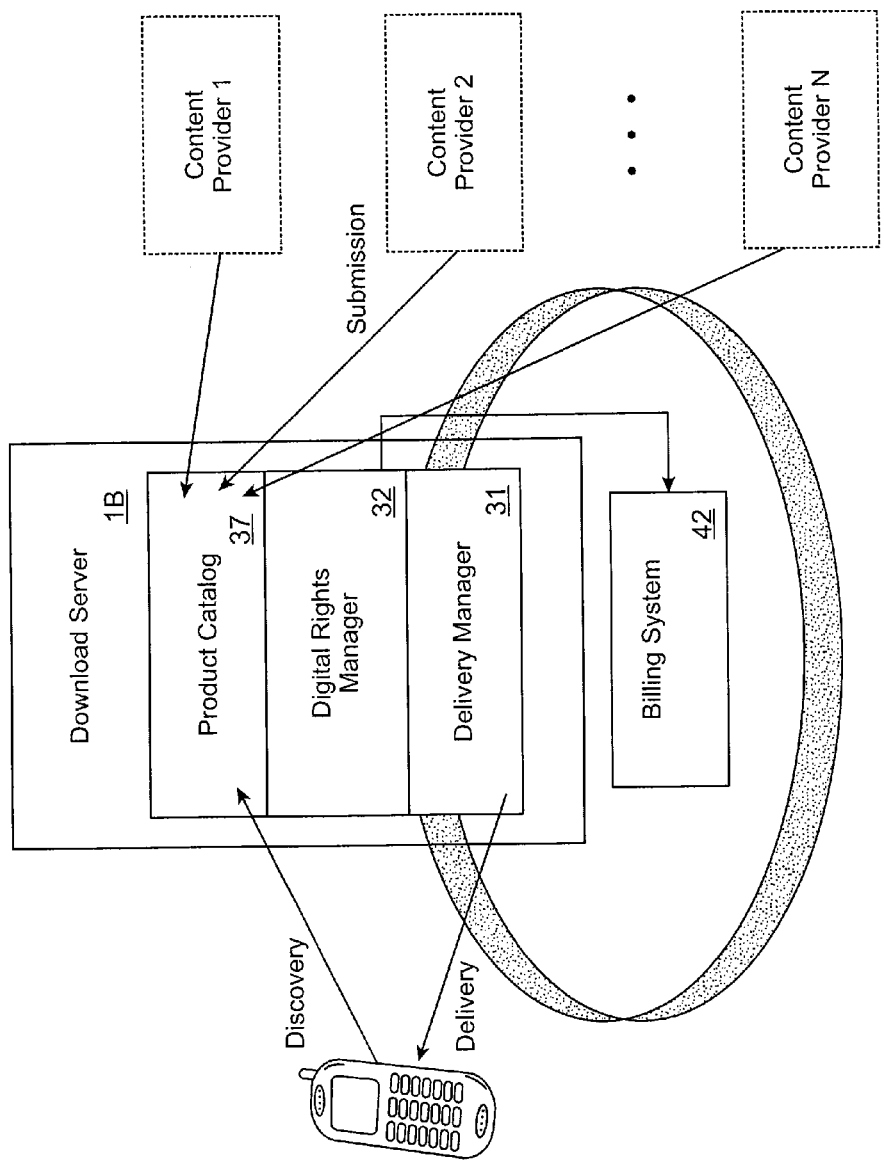
FIG. 4 shows the relationship between the download manager, content providers, and subscribers in a walled garden model.

A download server such as described above can be implemented in a walled garden model, as illustrated in FIG. 4. When a subscriber makes a purchase from the product catalog 37, the digital rights manager 32 issues a charge to the billing system 42 and records the subscriber's right to the content (i.e., a product license) in the personal vault 36 (not shown in FIG. 4). The subscriber may come back to the personal vault 36 for repeated content download.

The walled garden model for the discovery, purchasing and downloading of content has various shortcomings, such as noted above. Accordingly, it is desirable to avoid the normal problems associated with a walled garden model, while also avoiding the above-noted problems normally associated with a federated model.

Federated Model

Figure 5:
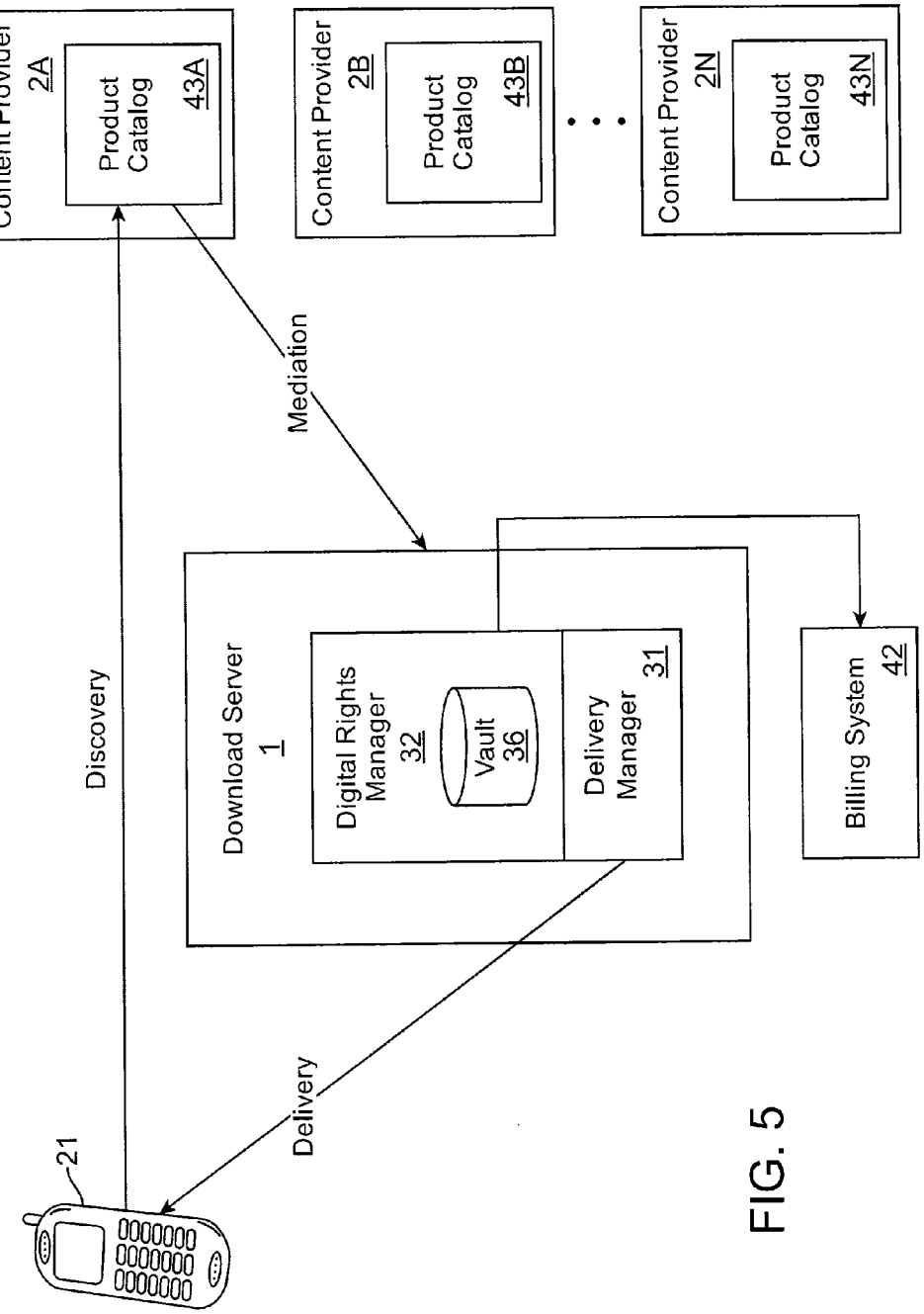
FIG. 5 shows the relationship between the download manager, content providers, and subscribers in a federated model.

A federated model according to certain embodiments of the invention is described now with reference to FIGS. 5 through 12. Referring first to FIG. 5, in the federated model, the download server 1 plays the role of a content proxy, and it is the content provider's responsibility to host the product catalog 43A . . . 43N and present the electronic storefront to the subscriber. Only after the subscriber has discovered the content and made the decision to purchase will the download server 1 become involved.

A significant challenge in building a federated solution is to come up with a simple yet powerful mediation protocol between the download server 1 and the content providers 2. The protocol must be simple to make it possible for third-party content providers 2 to integrate with a carrier-hosted download server. The protocol must be powerful so that download server 1 can add sufficient value in the content delivery value chain. Such a protocol will now be described.

The protocol, according to certain embodiments of the invention, is based on an entity referred to herein as a Universal Content Descriptor (UCD). The UCD allows the download server 1 to add value for third-party content providers in the areas of DRM, content instrumentation, content delivery, content monetization, content validation, and content caching. In certain embodiments, the UCD is an extensible markup language (XML) document which includes some or all of the following fields (not all of these fields are used in every embodiment or use case):

Vendor name
Product version
Product name with locale specified
Reference ID—unique identifier to a subscription plan or product bundle
Info URI—a reference (uniform resource identifier) to a more detailed offering page by the content provider
Content URI—a reference to the content binary file or another UCD. This can be zero or more.
MIME-type of the content file
Usage Model—The download usage model, with locale specified
Purchase price and currency code
subscriber who will own the license (not necessarily the same as the subscriber who made the purchase)
Success URL (uniform resource locator)—redirection of the client once delivery is complete
Failure URL—redirection of the client in the event of a failure on the download server.

Once content is discovered from a third-party content site, the client device 21 is redirected to the download server 1. The download server 1 uses the UCD URI passed as a parameter in the redirected URL to obtain a UCD from the content provider 2. Client redirection may be performed in any of several ways. In certain embodiments, for example, the content provider 2 codes the UCD directly into the product catalog. In other embodiments, a network gateway, such as gateway 23 in FIG. 2, redirects requests to the download server 1 based on content attributes such as the MIME-type. In still other embodiments, a download agent embedded in the client device 21 can redirect requests to the download server 1. Other embodiments may implement a combination of these approaches.

Referring now to FIGS. 6 through 12, the following use cases illustrate the value of the download server working in a federated model. These use cases assume (for purposes of explanation) that the content provider 2 codes the UCD directly into the product catalog.

Figure 6:
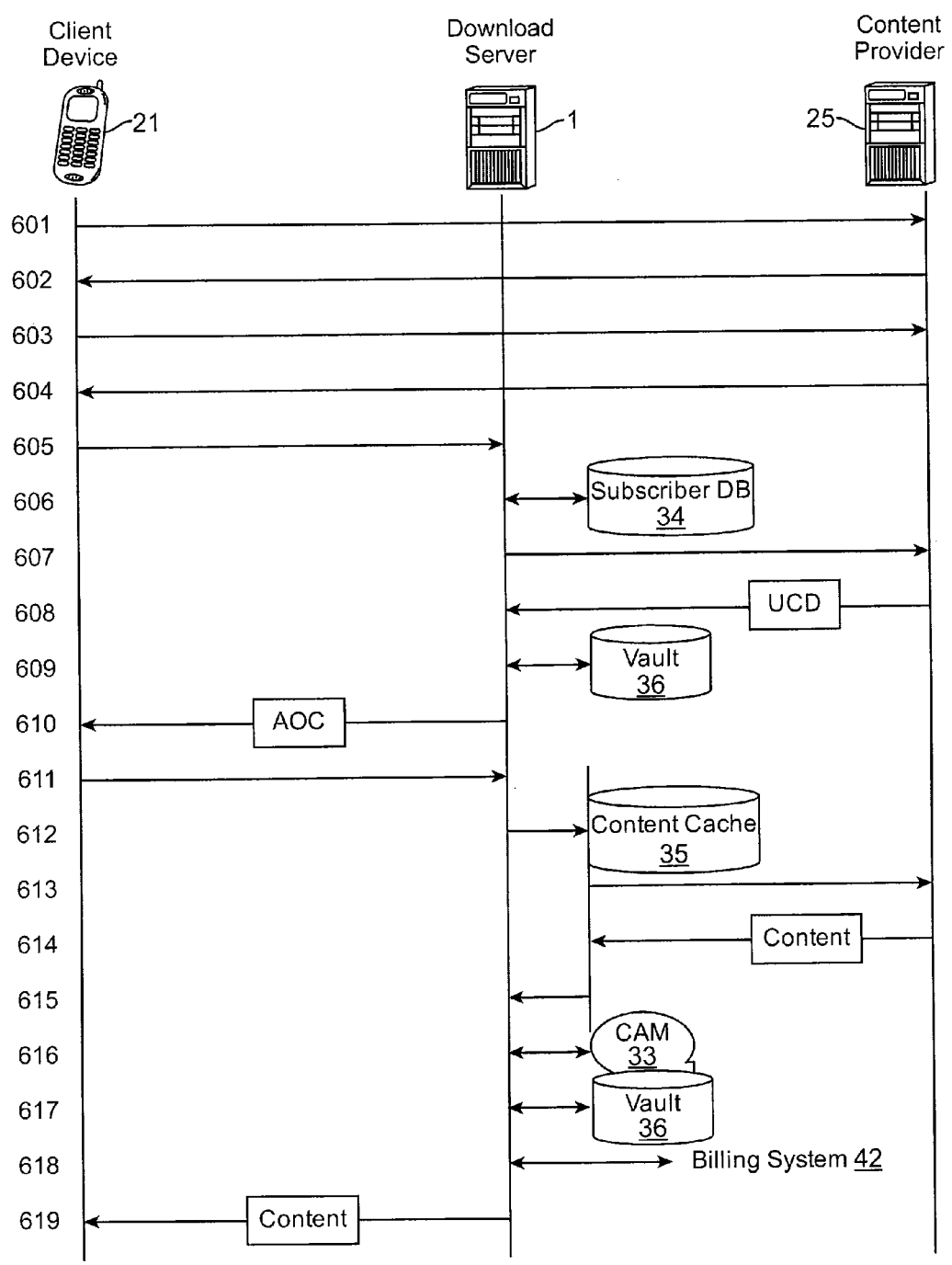
FIG. 6 illustrates an example of the process flow for basic content discovery, purchase and download.

Referring now to FIG. 6, an example of basic content discovery, purchase, and download is shown. At 601 a wireless services subscriber (user of wireless client device 21) navigates to a third party content server operator by a content provider. The content server 25 hosts content intended for wireless client devices 21. The content server 25 provides the discovery mechanism that analyzes the User-Agent and Accept headers received from the wireless client device 21 to determine the content supported by the wireless client device 21. At 602 the content server 25 responds to the request with a content catalog page in an appropriate markup language, such as wireless markup language (WML), with the enumeration of the supported downloadable content. The content server 25 is responsible for ensuring appropriate device capability matching has taken place and that the present content will work on the wireless client device 21. (Later the download server 1 will again verify that the content indeed works on the client device.) At 603 the subscriber selects the product to be purchased. At 604 the content server 25 responds with a redirect to the download server 1, passing the URI to the UCD file as part of the response. At 605 the client 21 is redirected to the download server 1. The URL to which the client is redirected can contain the URI to the UCD as a request parameter. At 606 the subscriber is authenticated by the download server 1 through the subscriber database 34 using, for example, an MSISDN authenticator. At 607 the download server 1 requests the UCD file for the selected product from the content server 25. At 608 the content server 25 responds with the UCD file. At 609 the download server 1 checks the subscriber's personal vault data and discovers the subscriber does not own a valid license for the selected product. At 610 the download server 1 responds with an Advisory of Charge (AOC) screen, displaying the product name, version, usage model, purchase price, and currency for the selected product. At 611 the subscriber confirms the purchase. At 612 the download server 1 checks to see if the product is in the content cache 35. At 613 if the product is not in the content cache 35, the download server 1 requests the content from the content provider using the "Content URI" field in the UCD. At 614 the returned content (the selected product) is stored in the content cache 35. At 615 the download server 1 obtains the content. At 616 the download server invokes the Content Analysis Manager (CAM) 33 to validate that the content will indeed run on the client device 21. At 617 the download server 1 records the usage model in subscriber's personal vault 36. At 618 the download server 1 charges the subscriber the purchase price, by making a call to the billing system 42. At 619 the download server 1 delivers the product to the wireless client device 21.

Figure 7:
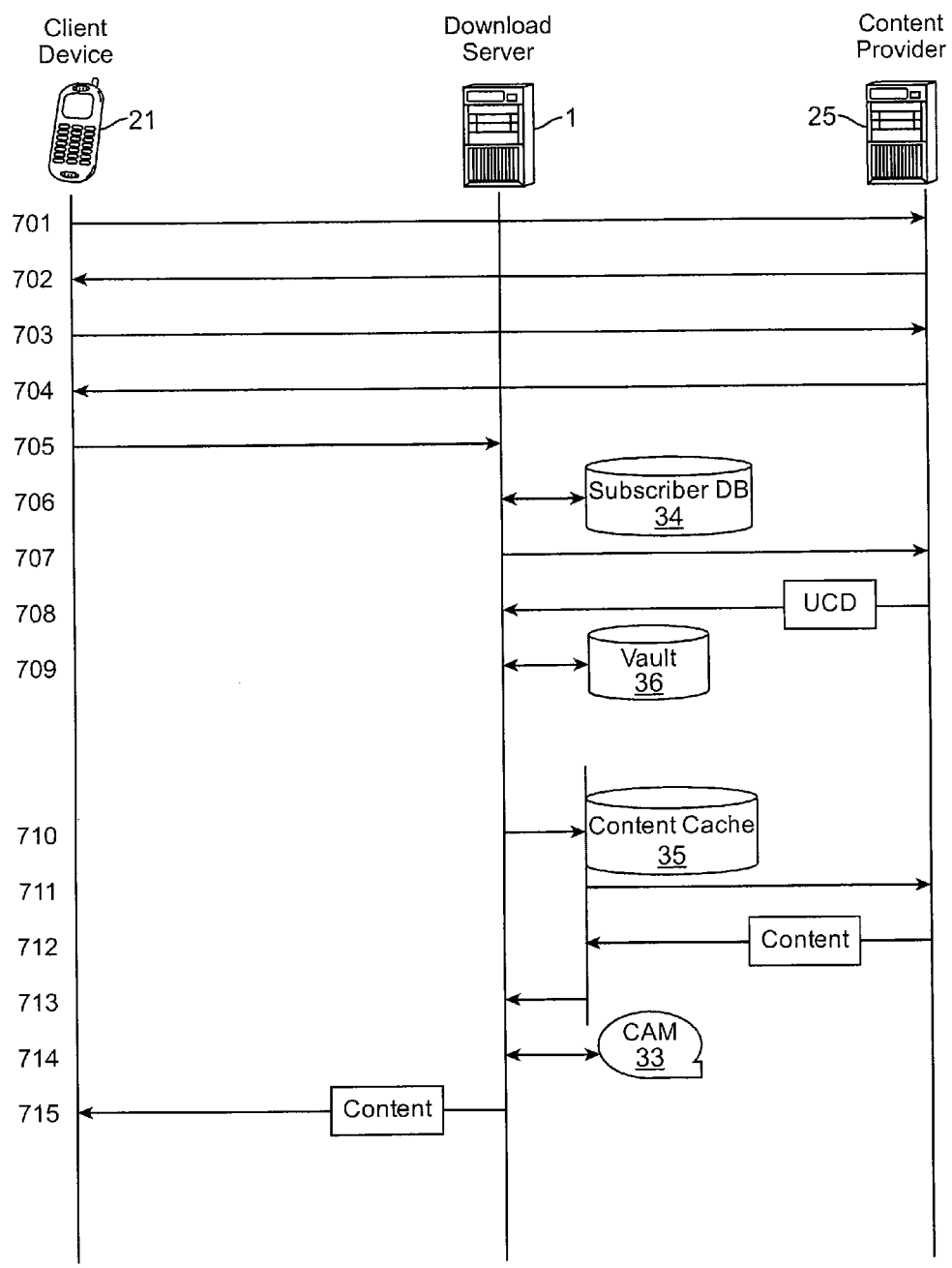
FIG. 7 illustrates an example of the process flow for downloading already-purchased content.

FIG. 7 illustrates a use case for the download of already-purchased content. In this case the subscriber navigates to the content server 25 and downloads a piece of content that he has already purchased. Operations 701 through 708 are the same as 601 through 608 in FIG. 6, respectively. Then at 709 the download server 1 checks the personal vault 36 and discovers that the subscriber already owns a license for the product and proceeds directly to content delivery. No AOC pages are sent. Operations 710 through 714 are the same as 612 through 616 in FIG. 6, respectively. Operation 715 is the same as 619 in FIG. 6.

Figure 8:
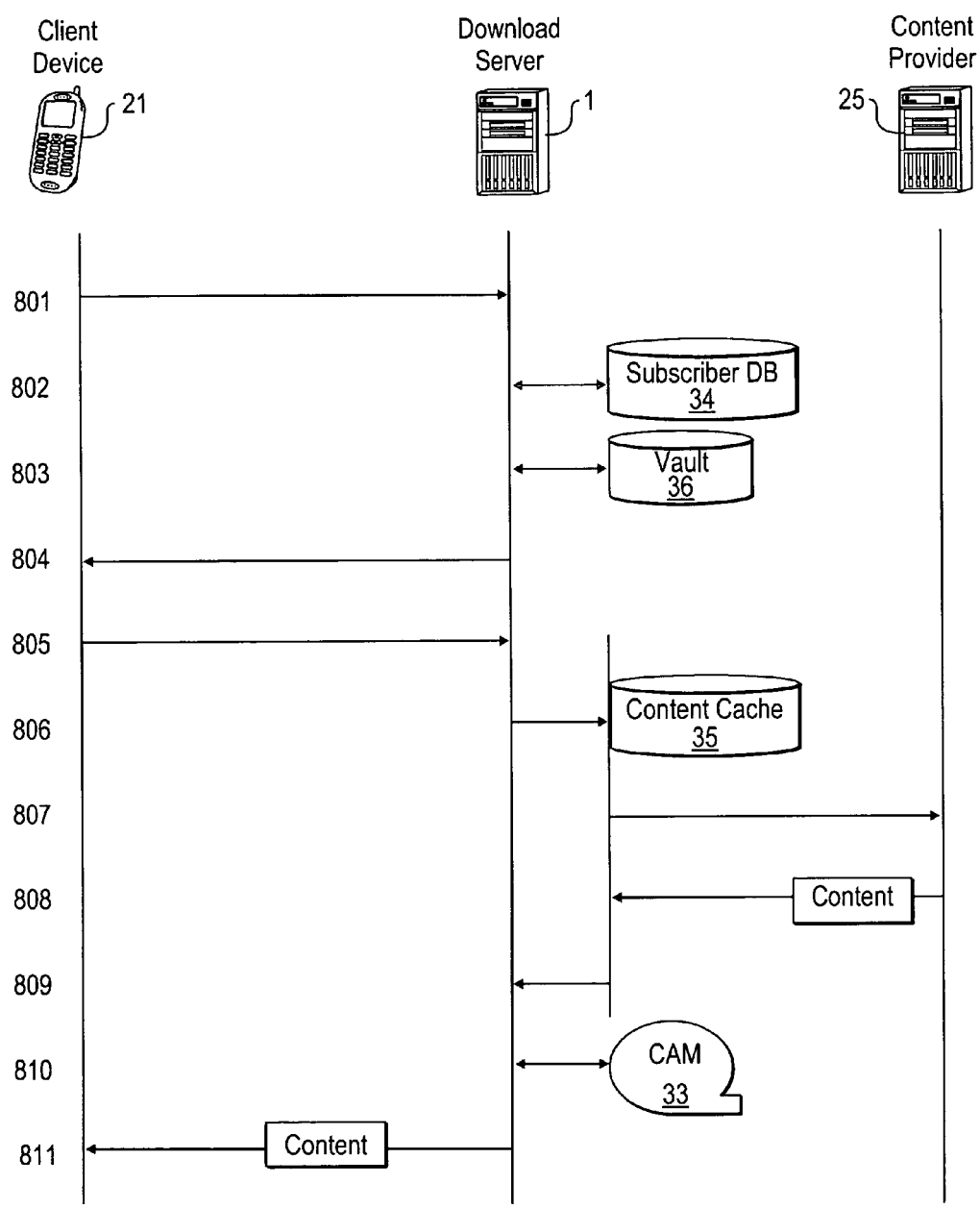
FIG. 8 illustrates an example of the process flow for direct download from the personal vault.
Figure 9:
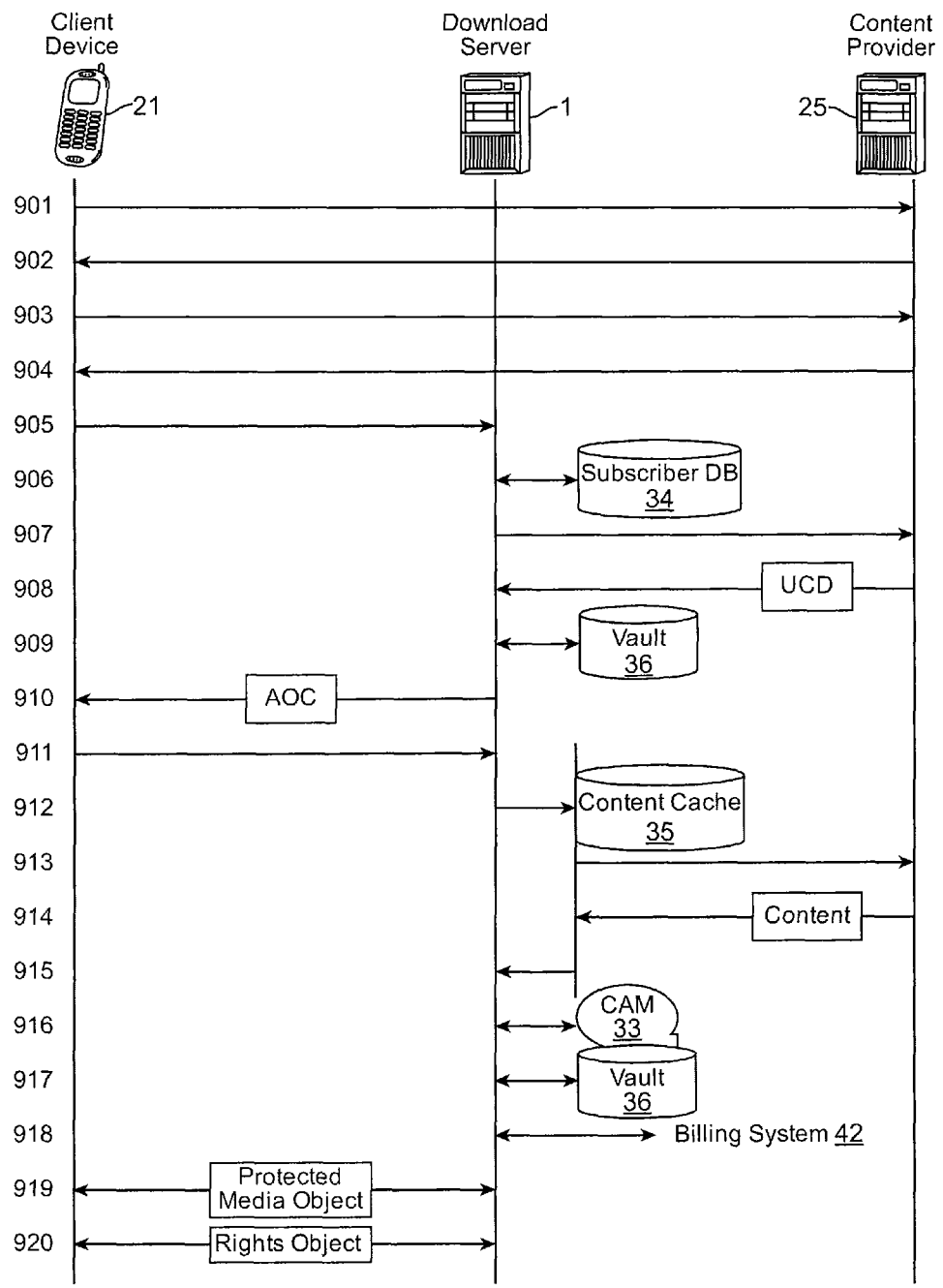
FIG. 9 illustrates an example of the process flow for separate delivery of an Open Mobile Alliance (OMA) Digital Rights Management (DRM) license.

FIG. 8 illustrates a use case for direct download to a client device from the personal vault 36. In the two use cases described above, the personal vault 36 is implicit. The subscriber does not directly interact with the personal vault user interface (UI). In this use case, the subscriber downloads already-purchased content directly from his personal vault 36. Thus, at 801 the subscriber accesses his personal vault page on the download server 1. At 802 the subscriber is authenticated through the subscriber database 34 using, for example, an MSISDN authenticator. At 803 the download server 1 fetches entries from the subscriber's personal vault 36. At 804 the download server 1 returns one or more WML pages containing all vault entries. At 805 the subscriber communicates a selection from the vault entries to the download server 1. Operations 806 through 811 are the same as 710 through 715 in FIG. 7, respectively FIG. 9 illustrates a use case for the separate delivery of an Open Mobile Alliance (OMA) DRM license. Operations 901 through 918 are the same as 601 through 618 in FIG. 6, respectively. At 919, the download server 1 packages the content according to OMA DRM standard and delivers a media object to the client 21. At 920 the download server 1 generates a corresponding rights object according to the usage model and delivers the rights object to the client 21.

Figure 10:
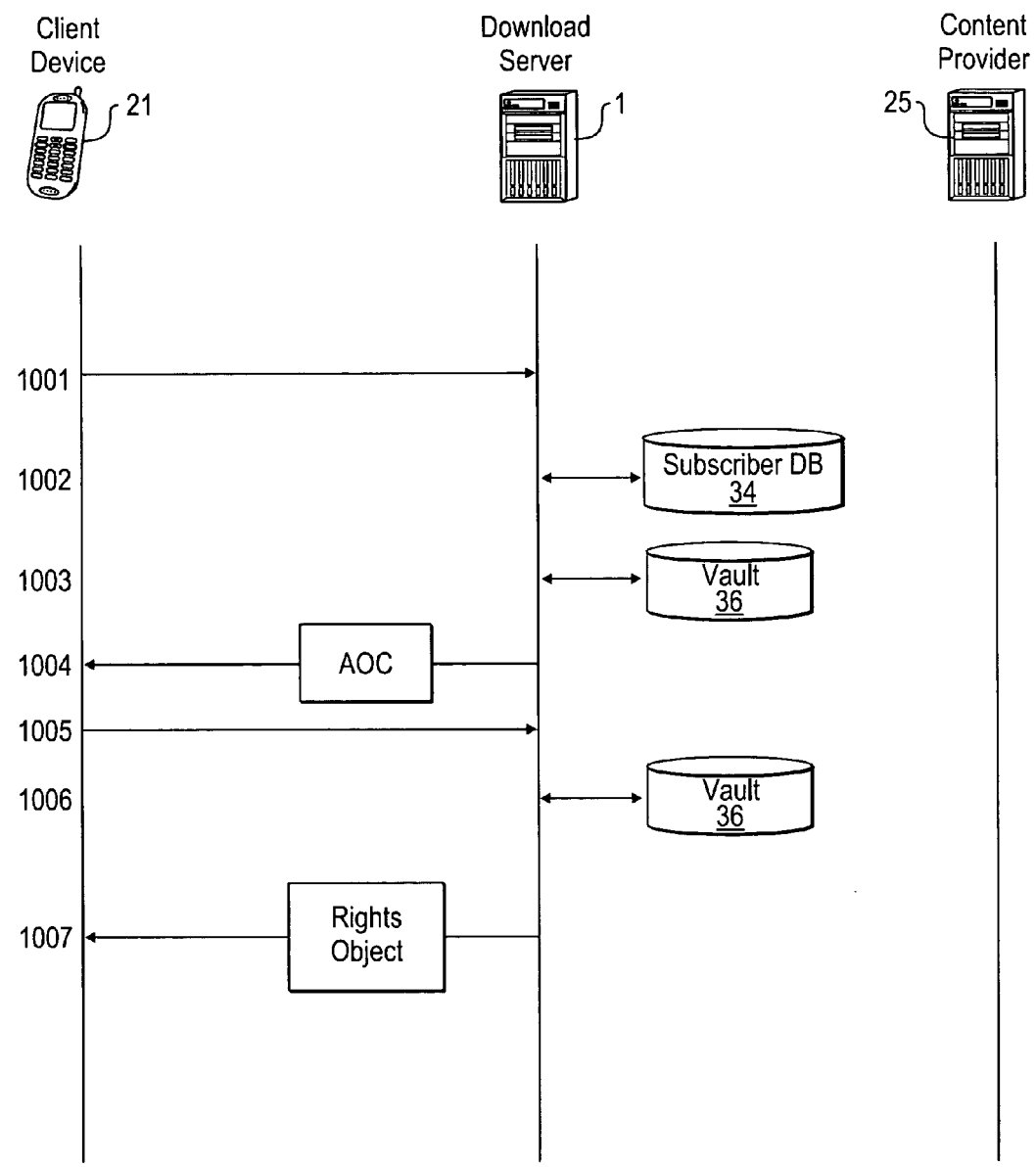
FIG. 10 illustrates an example of the process flow for renewal of an OMA DRM license.

FIG. 10 illustrates a use case for the renewal of an OMA DRM license. At 1001, when the license expires, the client's DRM agent generates a request to the Right-Issuer URL, which points to the download server 1. At 1002 the subscriber is authenticated through the subscriber database 34 using, for example, an MSISDN authenticator. At 1003 the download server 1 checks the subscriber's personal vault 36 to make sure the subscriber has indeed purchased the product before. At 1004 the download server 1 sends an AOC screen for license extension to the client 21. At 1005 the subscriber confirms purchase of an extended license. At 1006 the download server 1 updates the personal vault 36 to reflect the purchased license. At 1007 the download server 1 issues a new rights object to the client 21, allowing the subscriber's continuing use of the media object.

Figure 11:
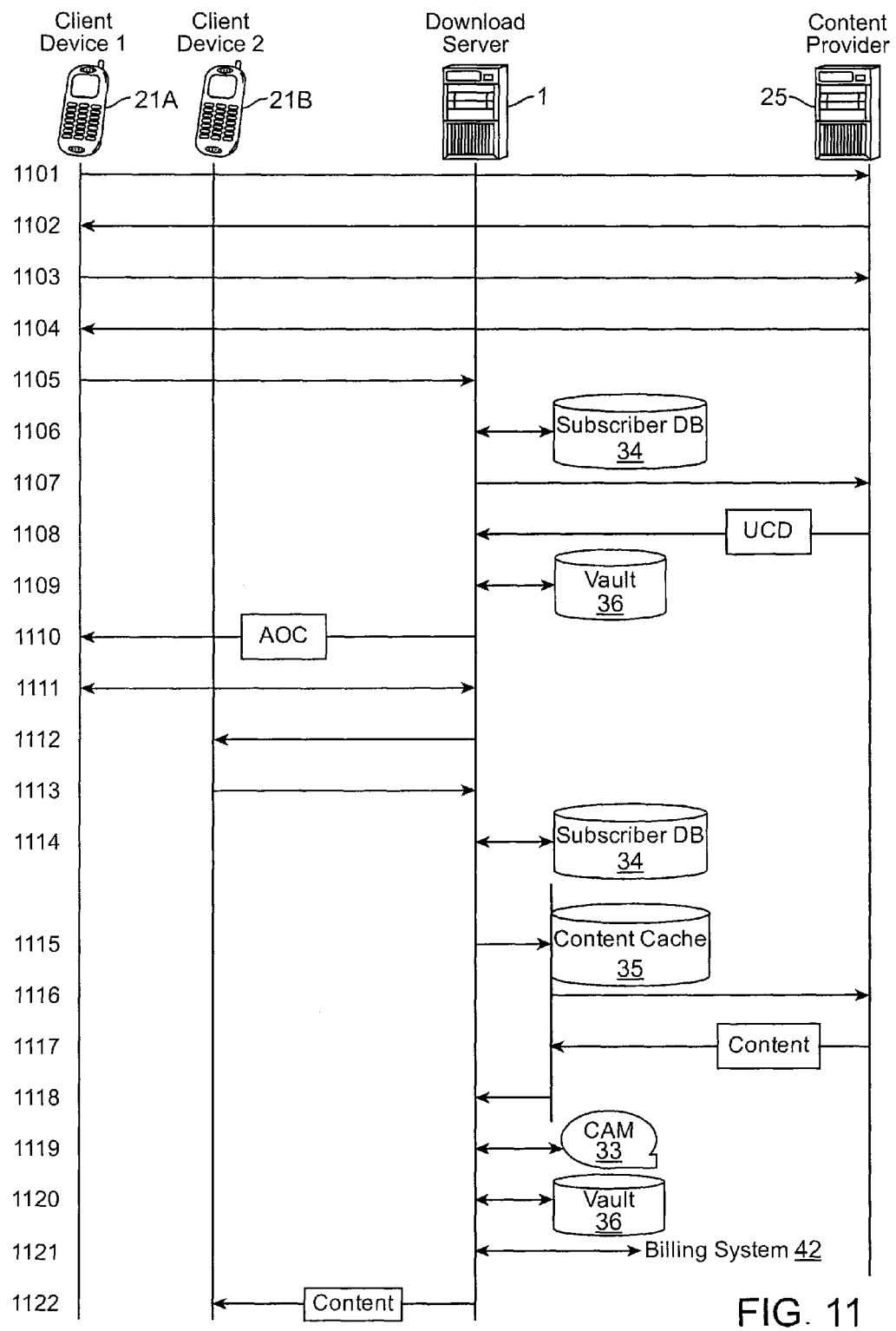
FIG. 11 illustrates an example of the process flow for purchasing content for another person.

FIG. 11 illustrates a use case where the subscriber purchases content for someone else, such as a friend. In this use case subscriber A using client 21A buys a piece of content for subscriber B using client 21B. Operations 1101 through 1108 are the same as 601 through 608 in FIG. 6, respectively, except that subscriber A selects to purchase the product for subscriber B, and that the content server 25 generates the UCD to indicate that subscriber B will own the product license. At 1109 the download server 1 creates a special vault entry indicating that subscriber A has expressed intent to purchase a particular piece of content for subscriber B. At 1110 the download server 1 responds with an AOC page. At 1111 subscriber A acknowledges the AOC page. At 1112 the download server 1 pushes a message to subscriber B on client 21B. The message indicates that subscriber A has expressed the desire to purchase a particular piece of content for subscriber B. At 1113 subscriber B decides to accept the content. This generates a request to the download server 1. At 1114 the download server 1 authenticates subscriber B.

The download server 1 recognizes that subscriber B is completing a purchase initiated by subscriber A. Following the same operations as 612 through 619 in FIG. 6, respectively, operations 1115 through 1122 proceed as follows: obtaining the content (1115-1117); performing quality assurance on the content (1119); updating subscriber 2's personal vault (1120); charging the content purchase to subscriber 1 (1121); and delivering the content to client 21B (1122).

In certain embodiments, the download server 1 can support various subscription based models, which would normally be defined by the content provider. A subscription plan is a logical association of product offerings, renewable on a periodic basis, which can be based on specified product criteria, such as category, MIME-type/Content type, vendor, etc. The following are examples of possible subscription plans, although the download server 1 can theoretically support any subscription plan defined by a content provider:

Subscription by All
Subscription by Vendor
Subscription by MIME-type/Content type
Subscription by Category
Subscription by One product In the above examples, which have the format, Subscription by [X], the user has access to all products in X if the user subscribes to X.

A subscription plan makes use of the UCD in the following ways different from a regular purchased content:

Info URI—Subscribers may be redirected to the content provider site to a more appropriate page describing the offerings of the plan. The download server will only contain the license for the subscription but will not offer the subscriber the list of offerings.

Reference ID—A unique identifier created by the provider to refer to a particular subscription plan. This identifier can then be used by subsequent content delivery to refer to the same subscription plan recognized by the download server.

Content URI—If this field is present, the download server delivers the content after confirmation of the AOC. If not, the user is redirected to the Success URI after confirmation.

Refer again to FIG. 6 for the use case of purchasing a new subscription plan. In such a use case, the first eight operations are the same as 601 through 608 in FIG. 6, respectively. Then, the download server 1 realizes that this is a subscription based on the Usage Model and Reference ID fields in the UCD. Download server 1 therefore checks the subscriber's personal vault 36 and discovers that the subscriber does not own a valid license for the subscription plan. Operations 612 through 619 are performed only if the Content URI of the UCD contains a valid entry. Otherwise, it redirects the user using the Success URI.

Once a content provider has sent the download server 1 a valid reference ID, that reference ID then becomes a link to a subscription plan with product offerings defined by the content provider. The download server 1 does not need to know which products can be offered by the content provider, as long as that reference ID is used to acknowledge that the content is part of a particular subscription plan. Refer again to FIG. 7 for the case of an already-purchased subscription plan. In this case, the first eight operations are the same as 701 through 708 in FIG. 7, respectively. Then, the download server 1 realizes this is a subscription based on the Usage Model and Reference ID fields of the UCD. The download server 1 checks the vault and discovers that the subscriber already owns the license (based on the reference ID) and proceeds directly to content delivery. No AOC pages are sent. Operations essentially identical to 710 through 715 are performed in this use case.

In certain embodiments, the download server 1 also supports bundling of digital products. Product bundling refers to associating a single price with two or more contents. A product bundle can come in the form of: a) single price, multiple contents, single usage model; or b) single price, multiple contents, multiple usage models per content.

A product bundle entails different use of the UCD than with single content delivery. For a product bundle, the first UCD retrieved by the download server 1 includes the following fields:

Info URI—Subscribers may be redirected to the provider site to a more appropriate page describing the product bundles.

Reference ID—A unique identifier created by the provider to refer to a particular product bundle. This identifier can then be used by subsequent content delivery to refer to the same product bundle recognized by the download server.

Content URI—This field contains one or more references to content UCDs. Each UCD represents a unique piece of content with its full price and usage model.

Price—The price of the product bundle

Usage Model—A model describing that this is a product bundle

Each UCD described by the Content URI represents a product that is part of the product bundle. The price described becomes the full price of the individual product when it is purchased separately from the bundle. The usage model is also unique to this product.

Figure 12:
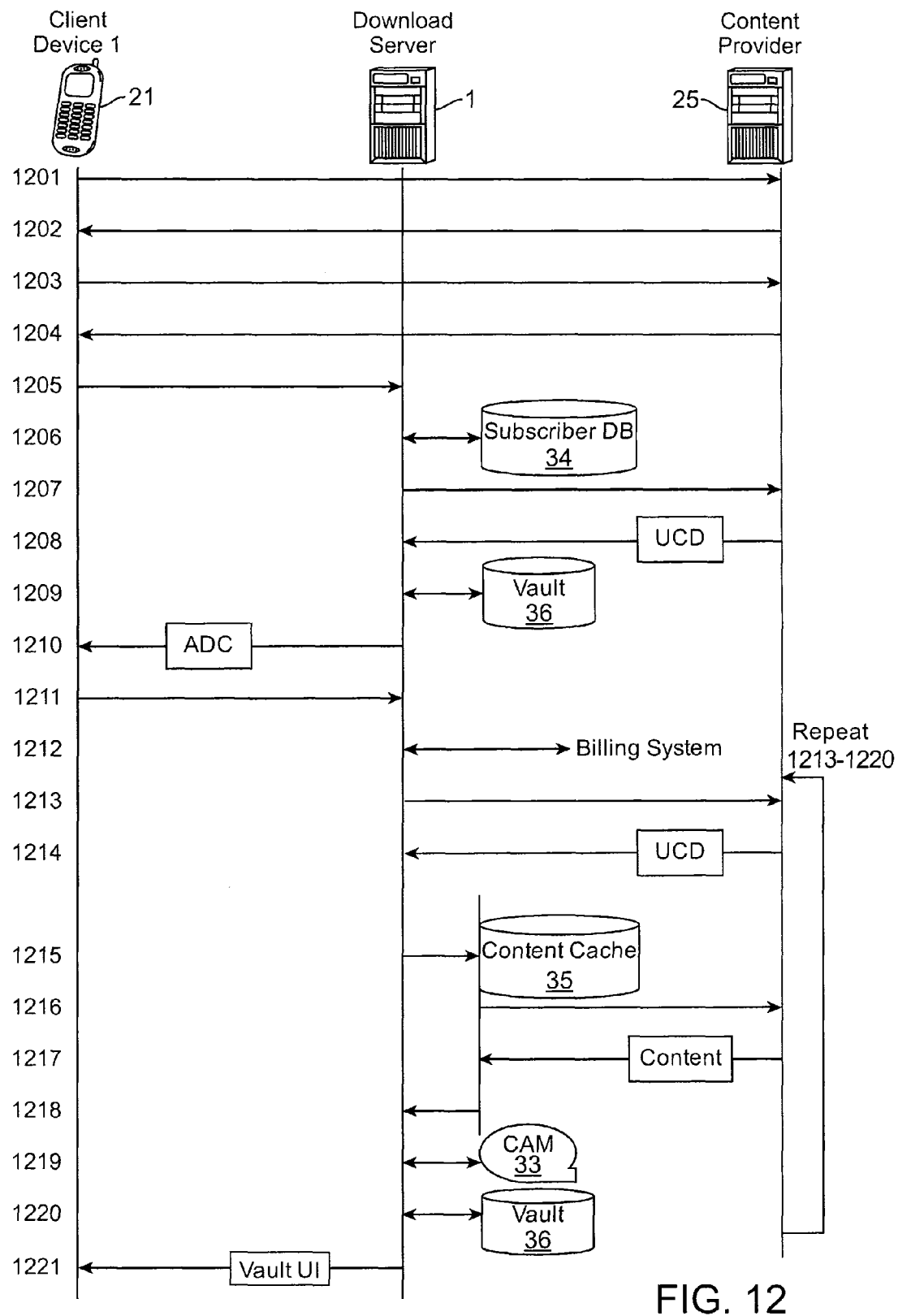
FIG. 12 illustrates an example of the process flow for discovery, purchase and download of bundled content.

FIG. 12 illustrates a use case for the new purchase of a product bundle. Operations 1201 through 1208 are the same as 601 through 608 in FIG. 6, respectively. At 1209 the download server 1 realizes this is a product bundle based on Usage Model and Reference Id. It checks the subscriber's personal vault 36 and discovers the subscriber does not own a valid license for the product bundle. At 1210 the download server 1 responds with an Advisory of Charge (AOC) screen, displaying product bundle name, version, usage model, purchase price, and currency. At 1211 the subscriber confirms purchase. At 1212 the download server 1 charges the subscriber the purchase price of the product bundle. At 1213 the download server 1 requests the UCD file from content provider based on the supplier content URI from the bundle UCD. At 1214 the content provider responds with the UCD file. Operations 1215 through 1220 are the same as 612 through 617 in FIG. 6, respectively, with respect to retrieving content from the content server 25. At 1221, the subscriber is redirected to the vault UI screen that shows the corresponding products for the bundle. Operations 1213 through 1220 are repeated based on the number of content URI provided by the bundle UCD.

Although subscribers will have paid one price for the product bundle, they will have access to the bundled content from their personal vaults, each possibly with its own usage model. The use case then becomes exactly the same as those in FIG. 7 and 8 for retrieving already-purchased content. If a particular usage model expires, the subscriber can purchase the full price of the product that was provided by the product's specific UCD, not the product bundle UCD price.

Figure 13:
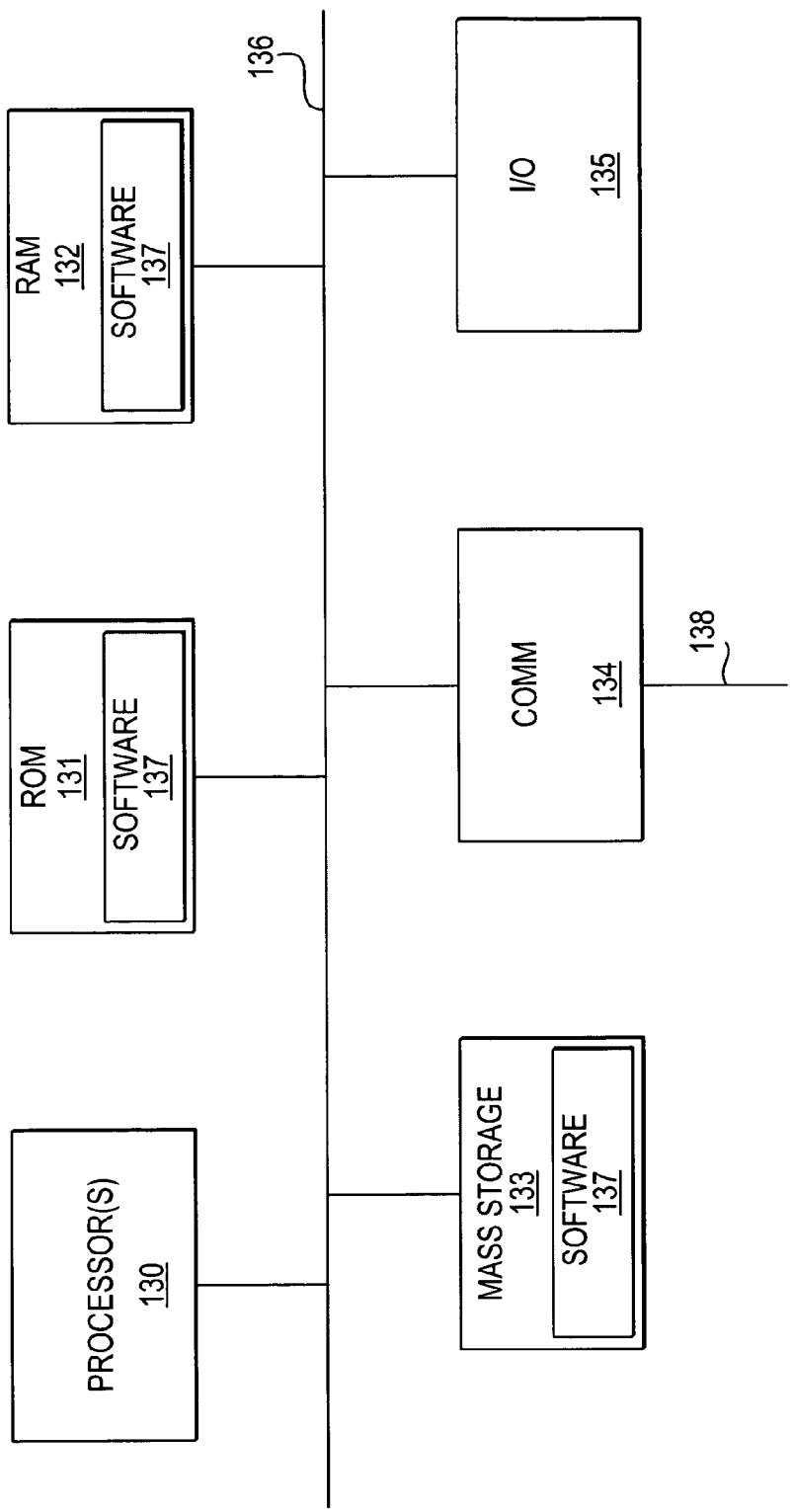
FIG. 13 illustrates the hardware architecture of a computer system in which the download manager can be implemented.

The above-described download manager 1 can be implemented in the form of one or more conventional server-class computer systems. Similarly, a content server 25 such as described above can also be implemented in the form of one or more conventional server-class computer systems. FIG. 13 illustrates the hardware architecture of such a computer system at a high-level. Note that this architecture is also representative of at least some client devices 21. Note also that FIG. 13 is a conceptual representation which represents any of numerous possible specific physical arrangements of hardware components; however, the details of such arrangements are not germane to the present invention and are well within the knowledge of those skilled in the art.

The processing system shown in FIG. 13 includes one or more processors 130, i.e. a central processing unit (CPU), read-only memory (ROM) 131, and random access memory (RAM) 132, each connected to a bus system 136. Also coupled to the bus system 136 are a mass storage device 133, a data communication device 134, and in some embodiments, one or more additional input/output (I/O) devices 135.

The processor(s) 130 may be, or may include, one or more programmable general-purpose or special-purpose microprocessors or digital signal processors (DSPs), microcontrollers, application specific integrated circuits (ASICs), programmable logic devices (PLDs), or a combination of such devices. The bus system 136 includes one or more buses or other physical connections, which may be connected to each other through various bridges, bus controllers and/or adapters such as are well-known in the art. For example, the bus system 136 may include a "system bus", which may be connected through one or more adapters to one or more expansion buses, such as a Peripheral Component Interconnect (PCI) bus, HyperTransport or industry standard architecture (ISA) bus, small computer system interface (SCSI) bus, universal serial bus (USB), or Institute of Electrical and Electronics Engineers (IEEE) standard 1394 bus (sometimes referred to as "Firewire"). In alternative embodiments, some or all of the aforementioned components may be connected to each other directly, rather than through a bus system.

The mass storage device 133 may be, or may include, any one or more devices suitable for storing large volumes of data in a non-volatile manner, such as a magnetic disk or tape, magneto-optical (MO) storage device, or any of various types of Digital Versatile Disk (DVD) or Compact Disk (CD) based storage, or a combination of such devices.

The data communication device 134 is a device suitable for enabling the processing system to communicate data with a remote processing system over a data communication link 138, and may be, for example, a conventional telephone modem, a wireless modem, an Integrated Services Digital Network (ISDN) adapter, a Digital Subscriber Line (DSL) modem, a cable modem, a radio transceiver, a satellite transceiver, an Ethernet adapter, or the like.

The I/O devices 135 (which may be omitted in a system that operates exclusively as a server and provides no direct local user interface) may include, for example, one or more devices such as: a pointing device such as a mouse, trackball, touchpad, or the like; a keyboard; audio speakers; and/or a display device such as a cathode ray tube (CRT), a liquid crystal display (LCD), or the like. Other variations upon the illustrated set of components can be implemented in a manner consistent with the invention.

Software (including instructions and data) 137 to implement the techniques described above may be stored in one or more of ROM 131, RAM 132, and mass storage device 133. In certain embodiments, the software 137 may be initially loaded into the processing system by downloading it from a remote system through the communication device 134.

Thus, a method and apparatus for federated download of digital content to wireless devices have been described. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method of providing a digital product to a first wireless client device using a download server comprising one or more processors and a memory, the method comprising, at the download server:

receiving, by the one or more processors, a redirected Uniform Resource Locator (URL) from the first wireless client device, wherein the redirected URL includes a Uniform Resource Indicator (URI) to a content descriptor corresponding to the digital product, wherein the download server is coupled to a remote content server through a computer network, the receipt of the redirected URL being a consequence of the receipt by the remote content server of a transmission comprising a selection of the digital product by a user the digital product being hosted by the remote content server, retrieving, by the one or more processors, the content descriptor directly from the remote content server using the URI to the content descriptor, the content descriptor including a URI to the digital product;

determining, by the one or more processors, that the digital product is not in a cache;

as a consequence of the determination, obtaining, by the one or more processors, the digital product from the remote content server using the URI to the digital product;

storing the digital product in the cache for use in subsequent downloads to one or more second wireless client devices, and sending, by the one or more processors, the digital product to the first wireless client device via a wireless network.

2. A method as recited in claim 1, wherein the content descriptor is encoded in a product catalog hosted by the remote content server.

3. A method as recited in claim 1, wherein the redirect is initiated by the remote content server.

4. A method as recited in claim 1, wherein the redirect is initiated by a gateway processing system located logically between the first wireless client device and the remote content server.

5. A method as recited in claim 1, wherein the redirect is initiated by a download agent embedded in the first wireless client device.

6. A method as recited in claim 1, wherein the digital product is described in a product catalog hosted by the remote content server, and wherein at least a portion of the product catalog is provided by the remote content server to the first wireless client device prior to the selection by the user, to enable the selection.

7. A method as recited in claim 1, wherein the content descriptor includes price information relating to the digital product.

8. A method as recited in claim 7, further comprising using the content descriptor to determine a payment status in relation to the user and the selection.

9. A method as recited in claim 8, further comprising processing a payment transaction in relation to the user and the selection if the payment status represents an unpaid status.

10. A method as recited in claim 1, wherein the content descriptor includes information for use by the download server to perform digital rights management (DRM) in relation to the selection.

11. A method as recited in claim 10, further comprising using, by the one or more processors, the content descriptor in the download server to determine a licensing status of the digital product in response to the selection.

12. A method as recited in claim 11, further comprising storing, by the one or more processors and the memory, digital rights management (DRM) information in the download server for a plurality of wireless services subscribers, wherein the use of the content descriptor to determine a licensing status for the digital product comprises using the DRM information.

13. A method as recited in claim 10, wherein the information in the content descriptor for use by the download server to perform DRM includes information specifying a licensee of the digital product.

14. A method as recited in claim 1, wherein the content descriptor includes:
   information describing the digital product;
   price information relating to the digital product; and
   information specifying a licensee of the digital product.

15. A method as recited in claim 1, further comprising:
   maintaining, by the one or more processors, a subscriber database in the download server containing information on a plurality of subscribers of wireless services; and
   authenticating, by the one or more processors, the user in the download server by using information from the subscriber database.

16. A method as recited in claim 1, further comprising validating that the digital product will run on the first wireless client device before downloading the digital product from the download server to the first wireless client device.

17. A download server on a network, comprising:
   one or more processors;
   a memory for storing executable instructions, which when executed by the one or more processors perform the steps of:
   receiving, by the one or more processors, a redirected Uniform Resource Locator (URL) from a first wireless client device, wherein the redirected URL includes a Uniform Resource Indicator (URI) to a content descriptor corresponding to the digital product, wherein the download server is coupled to a remote server through a computer network, the receipt of the redirected URL being a consequence of the receipt by the remote content server of a transmission comprising a selection of the digital product by a user, the digital product being hosted by the remote content server,
   retrieving, by the one or more processors, the content descriptor directly from the remote content server using the URI to the content descriptor, the content descriptor including a URI to the digital product;
   determining, by the one or more processors, that the digital product is not in a cache;
   as a consequence of the determination, obtaining, by the one or more processors, the digital product from the remote content server using the URI to the digital product;
   storing the digital product in the cache for use in subsequent downloads to one or more second wireless client devices; and
   sending, by the one or more processors, the digital product to the first wireless client device via a wireless network.

18. A method of providing a digital product to a first wireless client device using a download server comprising one or more first processors, a first memory, and a cache, and a remote content server comprising one or more second processors and a second memory, the method comprising:
   receiving, by the remote content server, a transmission from the first wireless client device, the transmission comprising a selection by a user of a digital product hosted by the remote content server;
   as a consequence of receipt of the transmission, the remote content server redirecting the first wireless client device to a URL of the download server, wherein the URL includes a URI to a content descriptor corresponding to the digital product, wherein the download server is coupled to the remote content server through a computer network,
   retrieving, by the download server, the content descriptor directly from the remote content server using the URI to the content descriptor, the content descriptor including a URI to the digital product selected by the user;
   determining, by the download server, that the digital product is not in the cache;
   as a consequence of the determination, the download server obtaining the digital product from the remote content server using the URI to the digital product; and
   storing the digital product in the cache for use in subsequent downloads to one or more second wireless client devices; and sending, by the download server, the digital product to the first wireless client device via a wireless network.

* * * * *